US012174791B2

(12) United States Patent  
Soncodi et al.

(10) Patent No.: US 12,174,791 B2  
(45) Date of Patent: Dec. 24, 2024

(54) METHODS AND PROCEDURES FOR TIMESTAMP-BASED INDEXING OF ITEMS IN REAL-TIME STORAGE

(71) Applicant: NetScout Systems Texas, LLC, Westford, MA (US)

(72) Inventors: Adrian C. Soncodi, Plano, TX (US); Balaji Ram, Allen, TX (US); Scott Sanders, Plano, TX (US)

(73) Assignee: Netscout Systems Texas, LLC, Westford, MA (US)

( * ) Notice: Subject to any disclaimer, the term of this patent is extended or adjusted under 35 U.S.C. 154(b) by 761 days.

(21) Appl. No.: 15/238,567

(22) Filed: Aug. 16, 2016

(65) Prior Publication Data

US 2018/0052858 A1 Feb. 22, 2018

(51) Int. Cl.  
*G06F 16/22* (2019.01)  
*G06F 16/13* (2019.01)

(52) U.S. Cl.  
CPC .......... *G06F 16/13* (2019.01); *G06F 16/2272* (2019.01)

(58) Field of Classification Search  
CPC ...... G06F 16/13; G06F 16/2272; G06F 16/22; G06F 16/2228  
See application file for complete search history.

(56) References Cited

U.S. PATENT DOCUMENTS

2004/0236746 A1* 11/2004 Lomet ................. G06F 16/2477  
2009/0113425 A1* 4/2009 Ports .................... G06F 9/4881  
718/1  
2014/0310466 A1* 10/2014 Vorbach .................. G06F 9/345  
711/119  
2015/0120749 A1* 4/2015 Phanishayee ....... G06F 16/2228  
707/741

FOREIGN PATENT DOCUMENTS

EP 2763041 A1 8/2014  
WO WO-2008043082 A2 4/2008

OTHER PUBLICATIONS

Extended European Search Report for European Patent Application No. 17186499.4, dated Jan. 15, 2018.

* cited by examiner

*Primary Examiner* — Amanda L Willis  
(74) *Attorney, Agent, or Firm* — Foley & Lardner LLP

(57) ABSTRACT

A method for storing time-based data streams in a high-capacity network is provided. A time-based data storage request is received from an application. The data storage request is associated with one or more data streams. Each of the data streams includes a plurality of time-ordered items having a header. The header includes two or more timestamps representing a time interval associated with each of the plurality of time-ordered items. The received data storage request is processed to accumulate time-ordered data items in a plurality of data files and to identify time-based information and corresponding virtual offset information related to the accumulated data items. The identified time-based information and the virtual offset information related to the accumulated data items are stored in a data repository. A determination is made whether adjustment is necessary for sorting the stored data in the repository. The sorting adjustment is selectively performed responsive to the determination.

9 Claims, 7 Drawing Sheets

METHODS AND PROCEDURES FOR TIMESTAMP-BASED INDEXING OF ITEMS IN REAL-TIME STORAGE

FIELD OF THE INVENTION

Embodiments of the present invention relate to network storage, and particularly to timestamp-based indexing of data items in real-time storage system.

BACKGROUND OF THE INVENTION

Time series data are sequences of time stamped records occurring in one or more usually continuous streams, representing some type of activity made up of discrete events. Examples include information processing logs, market transactions, audio, video and sensor data from real-time monitors (supply chains, military operation networks, or security systems). The ability to index, search, and present relevant time series data and/or search results is important to understanding and working with systems emitting large quantities of time series data.

Searching time series data typically involves the ability to restrict search results efficiently to specified time windows and other time-based metadata such as frequency, distribution of inter-arrival time, and total number of occurrences or class of result. For such real-time streaming/monitoring applications (client applications) data retrieval by timestamps is a common use case. However, in real-time high capacity networks time series data searches can return a massive amount of data items. A disadvantage of conventional indexing relates to situations in which a user wishes to interactively search a large number of matching items. In most relational database management systems that utilize conventional indexing techniques, if the set of query results is very large, the operation of writing/reading them to/from storage device can take a long time. Furthermore, in order to display the data in a meaningful manner, when presenting the time series query results to a user, client applications typically need the data to be sorted by time.

It is desired to have methods and procedures to perform optimized timestamp-based indexing of data within the storage layer itself.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method for storing time-based data streams in a high-capacity network is provided. A time-based data storage request is received from an application. The data storage request is associated with one or more data streams. Each of the data streams includes a plurality of time-ordered items having a header. The header includes two or more timestamps representing a time interval associated with each of the plurality of time-ordered items. The received data storage request is processed to accumulate time-ordered data items in a plurality of data files and to identify time-based information and corresponding virtual offset information related to the accumulated data items. The identified time-based information and the virtual offset information related to the accumulated data items are stored in a data repository. A determination is made whether adjustment is necessary for sorting the stored data in the data repository. The sorting adjustment is selectively performed responsive to the determination.

In another aspect, a method for searching time-based information in a high capacity network is provided. A time-based data retrieval request is received. The data retrieval request specifies a time frame and a search type. The received time-based data retrieval request is processed. Time-based information and virtual offset information is retrieved from a data repository based on the specified search type. The data repository stores the time-based information and the virtual offset information related to a plurality of stored data items. Each of the plurality of stored data items is associated with a time interval having a first timestamp indicating data item's begin time and a second timestamp indicating data item's end time.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
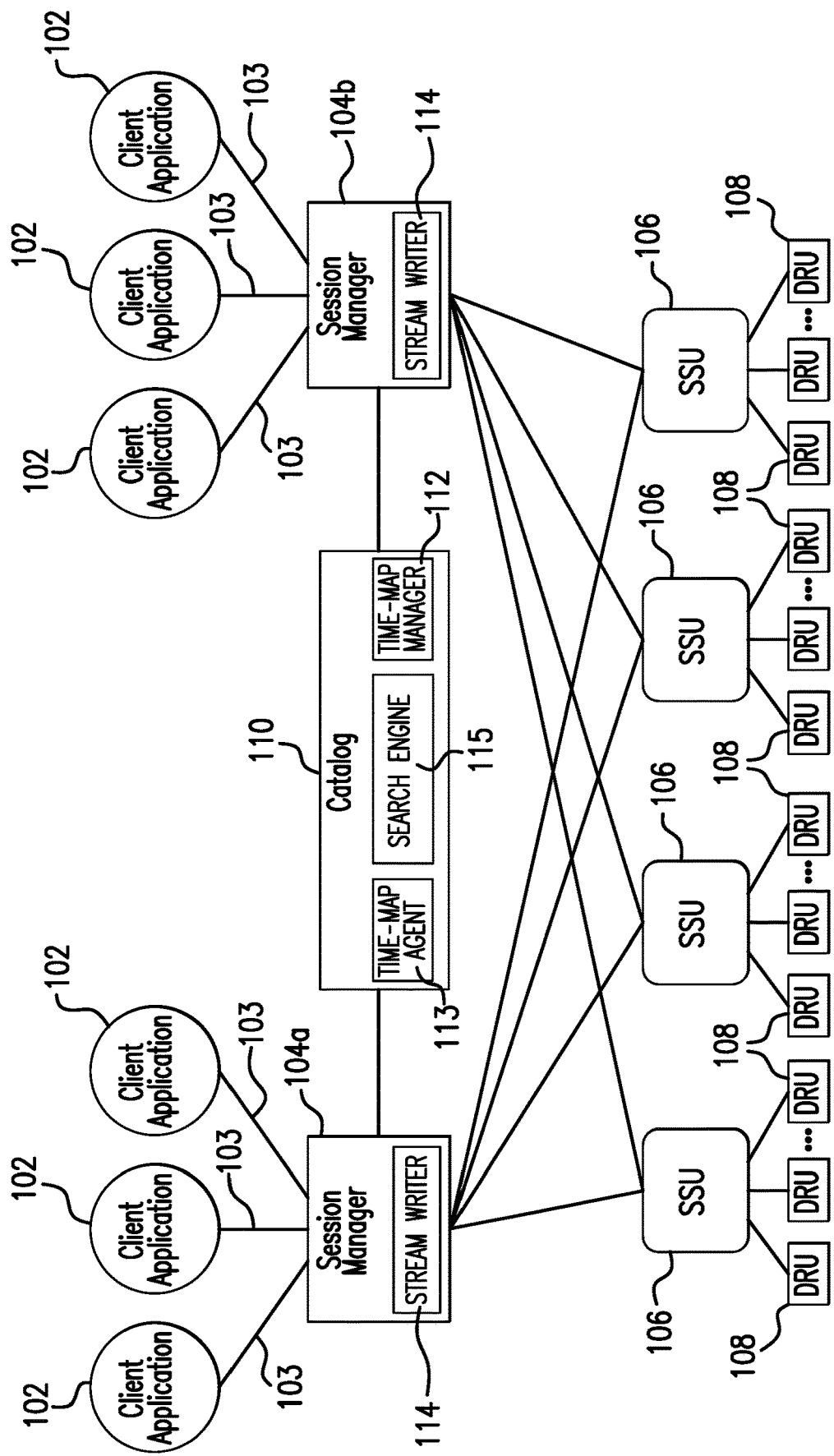
FIG. 1 illustrates a network computing environment in which aspects of the invention are implemented in accordance with certain illustrative embodiments.

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hard-wired) or temporarily configured (e.g. programmed) to operate in a certain manner and to perform certain operations described herein.

Described embodiments of the present invention concern a comprehensive distributed data management platform that includes a variety of mission critical applications, large number of application servers running different operating systems, processing nodes, storage units with differing capabilities, and many session managers that interconnect application servers with storage units. Transparently scalable storage management platform described herein deals with many storage aspects, such as, for example, but not limited to, storage network topology, performance, efficient data retrieval, and capacity planning as well as persistent aspects: e.g., processing real-time data access I/O requests received from a variety of both data traffic-generating and data traffic-receiving distributed client applications. The embodiments of the present invention describe various techniques for managing available resources, prioritizing requests, and sorting the received data based on the timing information associated with each data item.

Various embodiments are disclosed herein that enable support of a highly flexible and highly scalable storage system consisting of limited and variable storage resources. A high-throughput QoSt-enabled network avoids the shortcomings of the known storage solutions by providing a clustered, scalable highly available system to write to and manage high throughput streams of data in a stream based storage network. A heterogeneous storage system can evolve over time and can include an adequate combination of newly installed and relatively large storage devices and older/smaller storage devices.

Turning to FIG. 1, FIG. 1 is intended to provide a brief, general description of an illustrative and/or suitable exemplary network computing environment in which embodiments of the below described present invention may be implemented. A particular embodiment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

As illustrated in FIG. 1, a plurality of client applications 102 may transmit data (i.e., time-series data) to the storage network 100, which in turn distributes it over storage resources referred to herein as data repository units (referred to herein individually as "data repository unit 108" and collectively as "data repository units 108"). Storage nodes (referred to herein individually as "storage node 106" and collectively as "storage nodes 106") include various modules configured to store/retrieve data, provided/requested by applications 102 in/from data repository units 108. The applications 102 may reside on a plurality of application servers which may comprise any computational device known in the art (e.g., a workstation, personal computer, mainframe, server, laptop, hand held computer, tablet, telephony device, network appliance, etc.).

The data repository units 108 may comprise any storage device, storage system or storage subsystem known in the art that directly connects to the storage network 100 or is attached to one or more storage nodes, such as the data repository units 108 directly attached to storage nodes 106. The data repository units 108 may comprise a Just a Bunch of Disks (JBOD), Redundant Array of Independent Disk (RAID), Network Attached Storage (NAS), a virtualization device, tape library, optical disk library, etc.

The storage network 100 may comprise any high-speed low-latency network system known in the art, such as a Local Area Network (LAN), Storage Area Network (SAN), Intranet, Wide Area Network (WAN), the Internet, etc. LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

The storage nodes 106 may comprise any device capable of managing application access to a storage resource, such as any server class machine, a storage controller, enterprise server, and the like. It is noted that FIG. 1 depicts a simplified two-tiered model of the QoSt-based storage network 100. In various embodiments, the storage nodes 106 may be coupled to client applications 102 via a meshed topology of session managers (referred to herein individually as "session manager 104" and collectively as "session managers 104"). The various below described functions supported by this network tier may be distributed among several session managers 104. According to embodiments of the present invention, the data repository units 108 are viewed by the storage network 100 as the lowest-level entities in this hierarchy. One of the challenges by the QoSt based storage network's framework 100 is that data repository units 108 have highly uneven performance parameters (capacities, throughputs, etc.) that need to be managed.

As shown in FIG. 1, in one embodiment, client application instances 102 may be distributed across a number of network nodes, each instance capable of connecting to any available storage node 106 via functionality provided by session managers 104 with no substantial limitations regarding the amount or type of data it may send (except where physical boundary or limitations of bandwidth may apply). In various embodiments, session managers 104 rather than the client application instances 102 are tasked with allocating computing resources (e.g., program execution capabilities, data storage or management capabilities, network bandwidth, etc.), configuring (e.g., assigning IP addresses, VLANs, etc.) or monitoring bandwidth of each data repository units 108, maintaining separate file systems, and the like. It should be apparent that all of these are managed internally by the session managers 104 transparently to the application instances 102.

According to one embodiment of the present invention, connectivity to the session managers 104 may be defined in terms of generic pipes 103 of raw data items. Data piping between distributed applications 102 and storage network 100 (e.g., a data reader application 102 and a storage node 106) includes the session managers 104 reading/writing received/retrieved data items from/to a pipe 103, and the client application 102 writing/reading data items to/from the pipe 103. The pipe is a conduit of one or more streams of data items. It is noted that each pipe 103 can carry data items from any number of streams and from any number of initiators (i.e., client applications 102). For example, any application 102 can connect to the storage network 100 through pipes 103 at any point, without requiring any configuration. In other words, application 102 does not need to know which of the plurality of pipes 103 is connected to which of the plurality of storage nodes 106. Each application 102 may include an API which may support communication between applications 102 and session managers 104. Such API may support data access requests, typically data storage and data retrieval requests, from applications 102. From an application point of view, reading or writing information from/to the storage network 100 may be transparent. For example, since, according to various embodiments of the present invention, applications 102 read or write information from/to data pipes 103, preferably, these applications 102 are not particularly concerned with a type of storage system connected to the other end of the pipe. In fact, from their point of view, the storage network 100 does not necessarily comprise a distributed data storage network but may include any other type of storage solution, for instance a file server or a hard drive.

The plurality of session managers 104 is provided in the disclosed architecture for performing data management operations including optimized data storage, data sorting and optimized retrieval of data among other functionality. Various embodiments of the present invention contemplate that elastically scalable computing resources are dynamically distributed and redistributed on demand. In an aspect of the invention, the plurality storage nodes 106 may include a network interface to communicate with the plurality of data repository units 108 where the data repository units 108 hold files of content data and optionally metadata as opaque data, with each data content item (time-based data item) are being associated with one or more timestamps.

In addition, according to an embodiment of the present invention, the storage network 100 considers and evaluates all data as global. In other words any data item from any data repository unit 108 may be available for any application 102 under any sorting/data aggregation conditions. As the amount of data items stored by the storage network 100 increases and the storage network 100 becomes more complex, the ability to efficiently store and retrieve data to/from the storage system is becoming of greater importance in order to provide high performance for applications 102 that feed and retrieve data in real time. In one embodiment of the present invention, the storage network 100 has the ability to utilize timestamp based indexing techniques of data items associated with the received data access request and can provide customized processing of data items based on the time ranges included in the received data access requests. As described below, session managers 104 and catalog 110 provide the storage network 100 built-in capabilities to process, sort and distribute segmented data item streams collected from various client applications 102 as well as provide capabilities to retrieve and purge data according to various factors, such as, but not limited to, retrieving data items by relevant time ranges, purging data according to the retention policies defined by the stream storage and the like.

According to an embodiment of the present invention, storage nodes 106 illustrated in FIG. 1 can be flexibly distributed on heterogeneous hardware platforms and then directly interconnected as needed. Storage nodes 106 can also be grouped into "node groups" which are collocated depending on the total capacity/performance requirements requested by various applications. Furthermore, all software components may be entirely implemented on each storage node 106, or the software components may be implemented in a distributed computing environment on multiple types of storage nodes running the same or different operating systems and that communicate and interact with each other over the storage network 100. If a function provided by a specific software module/component is not available on a given storage node 106, then data traffic can be transparently re-routed to storage nodes 106 having that capability.

As noted above, various embodiments of the present invention utilize stream storage architecture and various timestamp based indexing techniques for providing stream-based data services, such as, but not limited to, storing, retrieving, and sorting time-based data items in real time. A stream-based data service is a service that involves client applications 102 sending and retrieving a stream of real-time application and data events. Generally, the timestamp based indexes indicate which storage files contain data items that pertain to a particular request submitted by a particular client application. Importantly, each index object includes a plurality of timestamps that indicate specific time ranges corresponding to byte ranges of data stored within the storage files. In one embodiment of the system, each timestamp represents an application generated time specification associated with content of each data item. However, persons skilled in the art will appreciate that it would be substantially impossible to provide an infinitely granular time-based index, so the time-based index, generally, can only be an approximation. Furthermore, persons skilled in the art will recognize the extreme unlikelihood of requested time ranges specified in particular data access requests exactly matching timestamps utilized by index records. Advantageously, various embodiments of the present application disclose time-based indexing techniques that allow returning substantially exact results to client applications that satisfy corresponding data access requests.

As a non-limiting example, such techniques include dynamic adjustment of each time-map index resolution based on the instant rate of the corresponding substream. Reading operation managed by storage nodes 106 typically extracts data items associated with successive relatively small time intervals from a plurality of substreams. It is desirable for catalogs 110 (described below) to manage balanced amount of data for each substream, rather than, for example, reading and merge-sorting 100 bytes for one substream and 100 MBs for another substream. Typically, high search resolution can be achieved by a storage system by storing relatively high numbers of entries in a RAM. However, the total amount of RAM memory reserved for timestamp based indices is typically limited. Advantageously, when memory utilization approaches a physical memory cap, catalogs 110 have an ability to dynamically adjust the granularity (resolution) of each timestamp based index.

Still referring to FIG. 1, in one embodiment, a plurality of timestamp-based index records (referred to hereinafter as "time-maps") may be stored in a catalog 110. As used herein, the catalog 110 comprises a distributed database containing a variety of real-time metadata information about data streams stored within the storage system 100. For example, the catalog 110 may maintain a complete list of streams (substreams), their QoSt attributes, timespans associated with each stream/substream. In addition to timestamp based indexes, the catalog 110 may further include a plurality of other context-based per-substream indexes, such as, but not limited to IP, International Mobile Station Identifier (IMSI), Called Party Number (CPN), etc.

Each catalog 102 may include one or more sub-components. In one embodiment these subcomponents may include a time-map manager 112, a time-map agent 113 and a search engine 115. Session manager's 104 subcomponent may include a stream writer 114. The stream writer 114 may generally be a software module or application that accesses the messages from the message pipes 103, the time-map agent 113 may generally be a software module or application that aggregates the received data access request, the time-map manager 112 may generally be a software module or application that generates and manages a plurality of time-based index records, the search engine 115 may generally be a software module or application that generates search results using the plurality of time-based index records.

Figure 2:
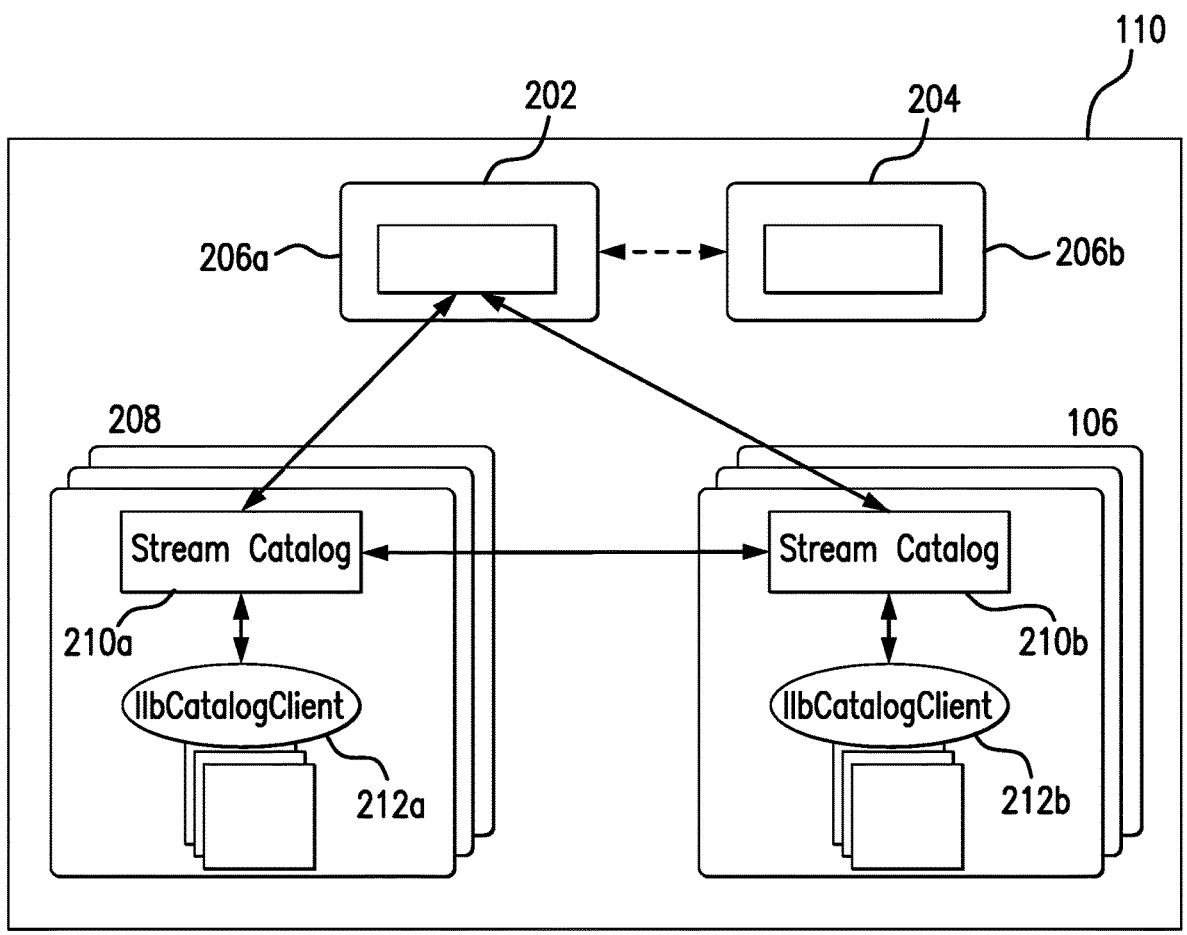
FIG. 2 is a block diagram depicting components that may be used to realize the catalog depicted in FIG. 1.

FIG. 2 is a block diagram depicting additional components that may be used to realize the catalog depicted in FIG. 1. The catalog 110 including one or more computing nodes providing the capability to manage a massive amount of data across multiple DRUs 108. In some embodiments, subcomponents of the catalog 110 may provide federated object storage on multiple computing nodes. By accessing the catalog 110, the session managers 104 have fast access to time-based index records, which considerably improves efficiency. It should be noted that requests to the catalog 110 are served at the lowest point in the hierarchy shown in FIG. 1, thereby minimizing traffic in the storage system 100. High availability clusters that support synchronous state replication to provide for failover between catalog nodes, and more precisely, provide persistence of the time based state of the storage system 100 in multiple nodes. In some implementations, the state of the storage system is restored across restarts, even if some nodes in the catalog cluster 110 are not available, which improves robustness of the storage system 100.

As noted above, the catalog 110 comprises a scalable high performance and highly available distributed database containing a variety of real-time metadata information about data stream content stored within the storage system 100 that enables fast searches and updates of data. The catalog 110 is configured to maintain a plurality of index records whose fields are updated in real-time to preserve order and retrieve data associated with the requested time interval faster. As described in greater detail below, the catalog 100 implements a flexible scheme that utilizes runtime search information such as a time range, start and/or end time of a transaction inside a data stream over which the index records will be searched, and the like. Advantageously, the catalog 100 is further configured to convert the received time-based metadata to a target data item index format suitable for the particular stream storage environment.

As shown in FIG. 2, high availability clusters that support synchronous state replication to provide for failover may include Master Board Controller (MBC) 202 and backup MBC 204 catalog nodes. MBC 202 and backup MBC 204 catalog nodes may include one or more processors, microprocessors, application specific integrated circuits (ASICs), field programming gate arrays (FPGAs), and/or processing logic for processing and storing centralized information. For example, the MBC 202 and backup MBC 204 may maintain separate instances of data repositories 206a and 206b. It is envisaged that each data repository 206a and 206b may comprise a single database or a collection of databases. Further, at least one of the catalog cluster nodes, i.e. MBC node 202 is configured and operable to communicate with one or more network monitoring probes 208 and one or more storage nodes 106. FIG. 2 illustrates the overall distributed nature of the catalog 110. For example, in one embodiment, each probe 208 and each storage node 106 may host an instance of Catalog software module, such as StreamCatalog module 210a-b (collectively referred to as Catalog instances). According to an embodiment, each stream catalog 210a-b may have access to relevant up-to-date time-based index data, stored locally and maintained by another catalog software component, such as libCatalogClient 212a-b also hosted by respective probes 208 and storage nodes 106. In one embodiment, the StreamCatalog module 210a-b may contain persistent information about all of the active substreams. The StreamCatalog modules 210a-b may be updated periodically (e.g., every few seconds) with comprehensive information about each time-based index record. For instance, the StreamCatalog 210 may be continuously updated with the last virtual offset from each substream on each SSU 106 and on each DRU 108. By interacting with each other and by accessing the data repository 206a, various above-described sub-components of the catalog 110 have fast access to time-based index records, which considerably improves efficiency.

Figure 3:
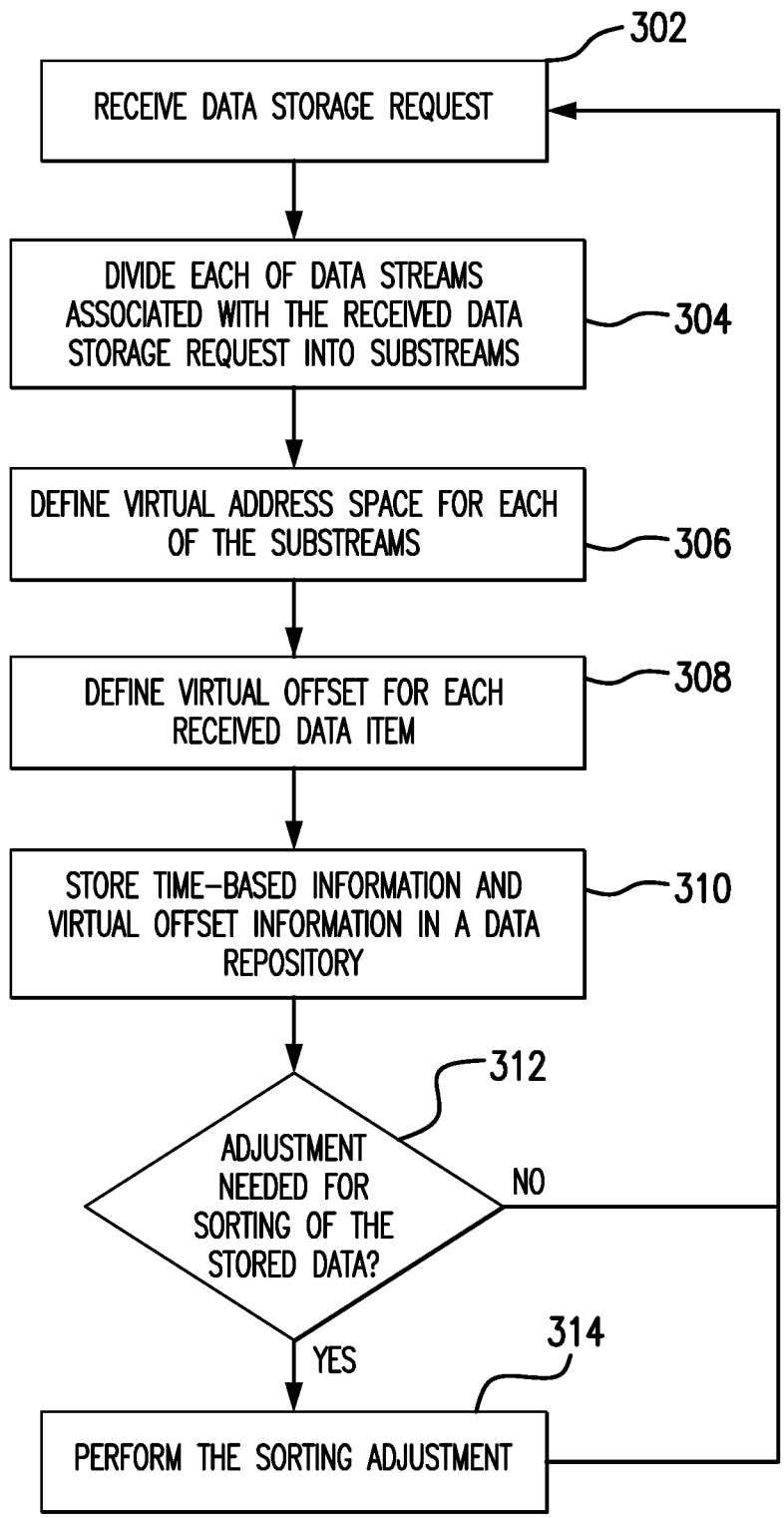
FIG. 3 is a flowchart of operational steps for storing and sorting received time-based data stream information performed by the session manager and catalog modules of FIG. 1, in accordance with an illustrative embodiment of the present invention.
Figure 6:
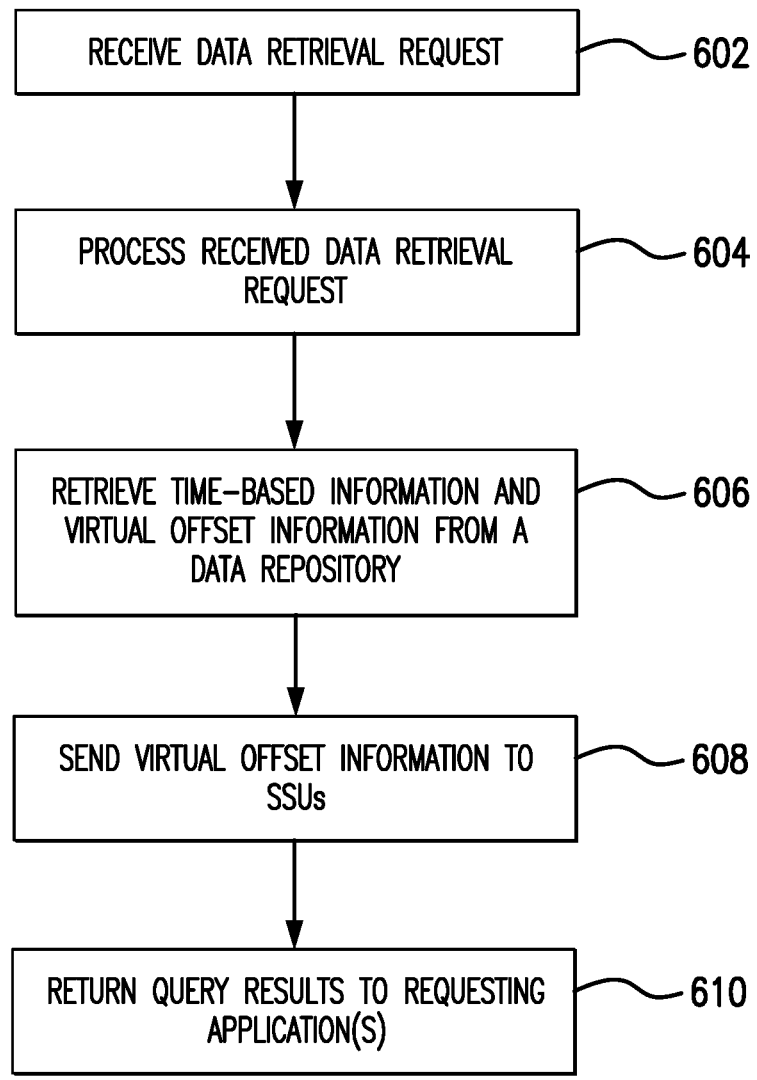
FIG. 6 is a flowchart of operational steps performed for retrieving time-based information performed by the session manager and catalog modules of FIG. 1, in accordance with an illustrative embodiment of the present invention.

FIGS. 3 and 6 are flowcharts of operational steps for storing and sorting received time-based data stream information and for retrieving time-based information, respectively, performed by the subcomponents of the session manager and catalog modules of FIG. 1, in accordance with exemplary embodiments of the present invention. Before turning to descriptions of FIGS. 3 and 6, it is noted that the flow diagrams shown therein are described, by way of example, with reference to components shown in FIGS. 1 and 2, although these operational steps may be carried out in any system and are not limited to the scenario shown in the aforementioned figures. Additionally, the flow diagrams in FIGS. 3 and 6 show examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may be included.

Starting with FIG. 3, at 302, the session manager 104 preferably receives one or more data storage requests from one or more client applications 102. The data storage request is associated with one or more data streams. Each of the one or more data streams includes a plurality of time-ordered data items having a header consisting of at least two timestamps representing a time interval associated with each of the plurality of time-ordered data items. In some embodiments, the session manager 104 may invoke the stream writer 114 as part of processing data storage request operations. The stream writer 114 may generally be a software module or application that accesses the messages from the message pipes 103.

According to an embodiment of the present invention, original data contained in various data streams associated with the received data storage requests can be divided into fragments referred to hereinafter as stream segments. A particular data stream may have a plurality of start and stop times associated therewith. Stream segments represent chunks of data associated with relevant time ranges (start/stop times) for each data stream. Thus, a stream segment contains a contiguous range of bytes that can be written to a corresponding DRU 108. In one embodiment, at 304, the stream writer 114 divides each received data stream into a plurality of substreams and/or stream segments associated with the received data streams and transmits them to one or more destination sub-components of the catalog 110, such as the time-map agent 113. The time-map agent 113 may generally be a software module or application that aggregates substream and or stream segments data associated with the received data access requests.

As data associated with the received data storage requests keeps coming in, the time-map agent 113 may accumulate a plurality of substream data items in a collection of data files. These multiple data files concatenated together define a virtual address space associated with each substream. According to an embodiment of the present invention, the time-map agent 113 may define a virtual address space associated with each received substream (step 306). Further, each data item of each substream is associated with a unique virtual offset in the virtual address space. As shown in FIG. 3, at 308, the time-map agent 113 defines virtual offset for each received data item. The virtual offset uniquely identifies data item's location in the virtual address space. In one embodiment, the step of defining the virtual offset includes associating by the time-map agent 113 the virtual offset with a name of a data file where the data item is stored and associating the data item with a physical offset. The physical offset uniquely identifies data item's location in the corresponding data file. At least in some embodiments, the time-map agent 113 also generates a unique item identifier, hereinafter referred to as Enhanced Direct Access Storage Address (EDASA), which can be mapped directly to item's physical address. In one embodiment, the generated EDASA includes a hierarchy of resource IDs and item's virtual offset information, which collectively identify item's physical address. For example, the EDASA may include at least some of the following information: data item's type and length indicator, a stream/substream ID associated with the data item, the identifiers of SSU 106 and DRU 108 associated with the data item, as well as additional control and error flags. In some cases, the time-map agent 113 may store lists of related EDASAs (for example, EDASAs corresponding to data items belonging to certain common flows within a substream) in a substream (of type list of EDASAs) based on some key, for example. This feature enables retrieval of EDASAs by time from the associated substream, which is substantially equivalent to searching stored data items by a key without the overhead of yet another index. According to an embodiment of the present invention, after defining virtual address space, virtual offsets and generating EDASA, the time-map agent 113 may pass the time-based information, the offset information and corresponding EDASA information to the time-map manager 112.

In one embodiment, this time-based information may include at least timestamp information. As noted above, each data item may have a header consisting of at least two timestamps denoted herein as tBegin and tEnd. For at least some data items, such as but not limited to, detailed flow records and detailed session records, the two timestamps represent a time interval associated therewith (i.e., time interval covered by a flow/session record). Other data items, such as network packet data items typically can be represented by only one timestamp, in which case tBegin=tEnd. However, if there is a significant difference between the time characterizing when the packet was received and the time characterizing packet storage, then both can be stored by the time-map agent 113 in the tBegin and tEnd timestamps, respectively. This enables the data search technique implemented by the time-map manager 112 and described below to perform consistently across different types of data items.

At step 310, the time-map manager 112 may store the received time-based information and offset information in the data repository 206. In one embodiment, the data repository 206 includes a table (referred to hereinafter as a "time-map table") where each entry associates a range of timestamps corresponding to a subset of the plurality of data items with a corresponding range of virtual offsets. For exemplary purposes, illustrated below is a time-map table (Table 1) that would be stored in the data repository 206.

TABLE 1

| tBeginLow | tBeginHigh | tEndLow | tEndHigh | Virtual offset range |
|---|---|---|---|---|
| 1 | 2 | 5 | 6 | 0 . . . 83 |
| 4 | 5 | 9 | 9 | 84 . . . 131 |
| 8 | 8 | 10 | 11 | 132 . . . 159 |
| 10 | 11 | 12 | 13 | 160 . . . 211 |
| 13 | 14 | 18 | 18 | 212 . . . 265 |
| 17 | 17 | 22 | 23 | 266 . . . 299 |
| 21 | 23 | 22 | 25 | 300 . . . 347 |

In the table 1, the tBeginLow column stores lowest (oldest) of all tBegin timestamp values for the data items associated with the corresponding virtual offset range stored in the Virtual offset range column; the tBeginHigh column stores highest (most recent) of all tBegin timestamp values for the data items associated with the corresponding virtual offset range; the tEndLow column stores lowest (oldest) of all tEnd timestamp values for the data items associated with the corresponding virtual offset range; the tEndHigh column stores highest (most recent) of all tEnd timestamp values for the data items associated with the corresponding virtual offset range. It should be noted that as the time-map manager 112 continues to periodically receive the time-based information and offset information from the time-map agent 113, the time-map manager may continue to add more entries to the time-map table. In long term operations, the number of entries contained in the time-map table can grow significantly.

Table 1 above illustrates the general nature of overlapping time ranges between the stored entries. There may be time gaps between the stored entries, for example, when there are time intervals with no packets transmitted over a network for a given substream. In an embodiment, the time-map agent 113 may apportion the time-based information contained in a substream into multiple regions of virtual address space (e.g., allotted as disjoint virtual offset ranges). It will be apparent to those skilled in the art that in such embodiment there may be offset gaps between the stored entries, for example, when a substream has been stopped (deleted) if the storage system 100 is low on available resources (i.e., bandwidth). However, if a particular substream is continued after a pause, advantageously, the time-map agent 113 continues with allotted (disjoint) virtual offset ranges, so that there will be no gaps in the data file. In other words, the time-map agent 113 ensures that there are no gaps in data files except possibly at the end, if a file has been only partially filled.

As will be described in greater detail below, the time-map manager 112 may utilize a binary search method to search the time-map table. Binary search is a rapid method of searching through sorted data. Thus, binary search is not as useful when the data is unsorted or semi-sorted. Referring back to FIG. 3, after each update (i.e., generation of a new time-map entry), the time-map manager 112 checks the newly generated time-map entry against some of the previously stored entries and, if necessary, fixes the time-map table. Accordingly, at step 312, the time-map manager 112 determines whether adjustment is needed for sorting of the previously stored data.

It should be noted that each mapping entry of a set of entries stored in the time-map table may include an identifier of the data file block that contains the items associated with this entry. Each mapping entry may further include time-based information and virtual offset information that support time-based searches and offset-based searches described below. In one embodiment, the time-based information may include tBeginLow—lowest tBegin timestamp for items associated with this entry, tBeginHigh—highest tBegin timestamp for items associated with this entry, tEndLow—lowest tEnd timestamp for items associated with this entry and tEndHigh-highest tEnd timestamp for items associated with this entry. In one embodiment, the virtual offset information may include offLow—lowest virtual offset for items associated with this entry and offHigh—highest virtual offset for items associated with this entry. At least in some embodiments, time-map entries may further include storage node 106 identifiers and DRU 108 identifiers, thusly linking the entry to physical storage objects. By storing this information in time map entries, the time map manager 112 is enabled to move substreams between various storage nodes 106 and various DRUs 108, for example, to optimize system capacity and/or throughput. In addition, in some embodiments, time-map entries may include statistical and error handling information. For instance, the statistical information may indicate the number of items associated with a corresponding entry, while the error handling information may include various error flags (i.e., gaps in virtual offsets, I/O errors on writing, etc.).

In one embodiment, at step 312, the time map manager 112 determines whether either time-based information (i.e., information stored in any of the following columns: tBeginLow, tBeginHigh, tEndLow, tEndHigh) or the virtual offset information (i.e., information stored in the Virtual offset column) needs fixing to become strictly sorted. It should be noted that the timestamp columns may require additional sorting if there is some disordering in the timestamp header fields of the received data items and the Virtual offset column may require additional sorting if there is some disordering in the updates received from the time-map agent 113.

In response to determining that adjustment is needed for sorting of the stored data (decision block 312, "yes" branch), at step 314, the time-map manager 112 may perform the sorting adjustment as described below.

Figure 4:
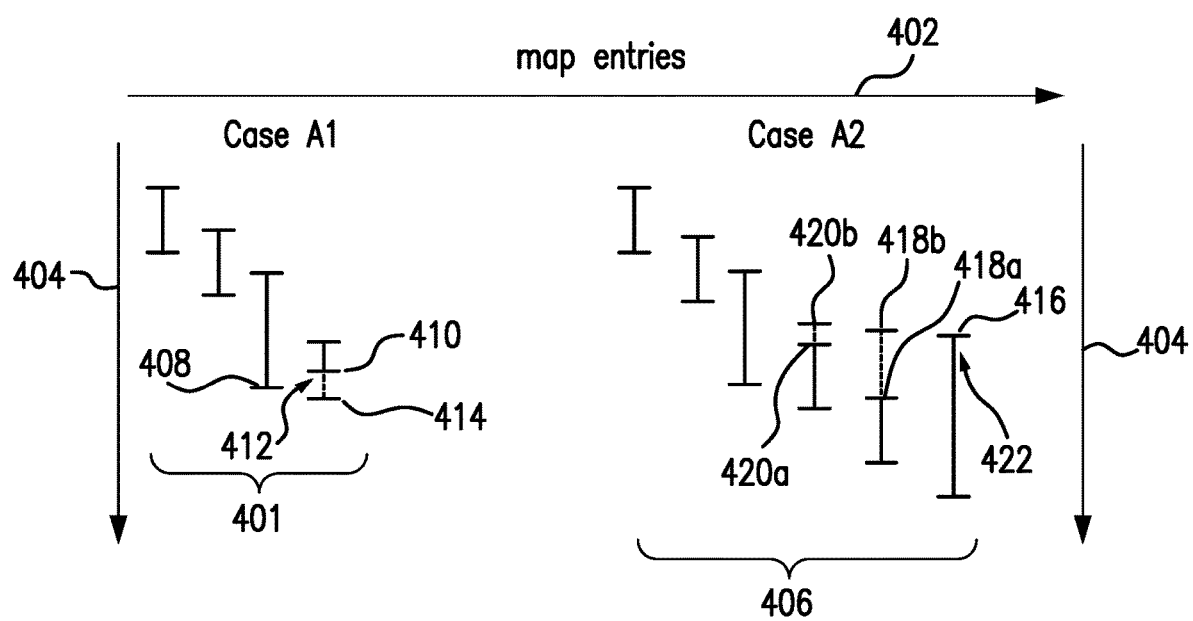
FIG. 4 is a sorting effects diagram of time-based information being sorted by the catalog module of FIG. 1, in accordance with an illustrative embodiment of the present invention.

FIG. 4 is a sorting effects diagram of time-based information being sorted by the time-map manager subcomponent of the catalog module of FIG. 1, in accordance with an illustrative embodiment of the present invention. In FIG. 4, a horizontal axis 402 represents exemplary successive entries stored in the time-map table, while vertical axes 404 represent direction of time flow. It will be apparent to those skilled in the art, that the time interval associated with each time-map entry can be extended at both ends without any loss of data item information. In other words, since all data items associated with a particular time-map entry were inside the initial time interval, they will remain inside the extended interval as well.

The following provides one example of pseudocode that may be utilized by the time-map manager 112 to determine upon inserting a new entry into the time-map table whether adjustment to any timestamp columns is needed and to perform such adjustment:

IF new entry's tHigh is not strictly greater than previous table entry's tHigh THEN
    Make new entry's tHigh=previous table entry's tHigh+1 ns
IF new entry's tLow is not strictly greater than previous table entry's tLow THEN
    Make previous table entry's tLow=new entry's tLow−1 ns
    Repeat for the entries preceding the previous table entry (going back as needed),
where tHigh represents either tBeginHigh column or tEndHigh column and tLow represents either tBeginLow column or tEndLow column. Thus, to achieve the strict order of entries required by the binary search method, a 1 nanosecond delta is chosen, such that every entry has a distinct value (in sorted order). It is further noted that for any given time-map update performed by the time-map manager 112 at step 310, any of the timestamp columns may require a sorting adjustment. It is further noted that while the above pseudocode adjusts only a single time-map entry's tHigh column, the tLow column adjustment may be applied recursively to a number of preceding time-map entries. In various embodiments, the time-map manger 112 may stop after making a pre-defined number of backward sorting adjustments for tLow columns. In one embodiment, such pre-defined limit may be based on both a maximum time interval and maximum number of entries to go back. In various embodiments, the pre-defined number of backward sorting adjustments may pertain to content of time-based data items. For example, if each data item contains one or more network packets, to perform sorting adjustments it may suffice going back a single entry. However, if each data item contains a flow record, any suitable number can be used as the pre-defined limit for time-stamp columns being precisely sorted, as described above. It should be noted that if the time-map manager 112 needs to go backward beyond the first entry in a currently used time-map table, the time-map manager 112 should access the last entry in a preceding time-map table associated with the currently used time-map table with respect to time. In one embodiment, the preceding time-map table may comprise another time-map file being maintained by the time-map manager 112.

Referring back to FIG. 4, there are shown two different illustrative examples of timestamp adjustments performed by the time-map manager 112. In a first example 401 there are shown three previously stored time-map entries and a new entry 412 received by the time-map manager 112. Each time-map entry is associated with the tLow and tHigh timestamps. However, new entry's tHigh 410 is not strictly greater than previous (last) table entry's tHigh 408. According to the above pseudo-code, in this case the time-map manager 112 extends the time period associated with the new entry 412, so that new entry's tHigh value 410 is equal to last table entry's tHigh value+1 ns. The adjusted new entry's tHigh value is labeled in FIG. 4 as 414.

In a second example 406 there are shown five previously stored time-map entries and a new entry 422 received by the time-map manager 112. Each time-map entry is associated with the tLow and tHigh timestamps. However, new entry's tLow 416 is not strictly greater than previous (last) table entry's tLow 418a. According to the above pseudo-code, in this case the time-map manager 112 extends the time period associated with the previous entry 418 at the other end, so that the last entry's tLow value 418b is equal to new table entry's tLow value−1 ns. However, after this adjustment, the last entry's tLow value 418b is not strictly greater than previous table entry's tLow 420a. Thus, in this case the time-map manager 112 repeats the tLow timestamp adjustment process for the previous entry as well. In other words previous table entry's tLow 420a becomes equal to new table entry's tLow value−2 ns. The adjusted previous entry's tLow value is labeled in FIG. 4 as 420b. It should be noted that in some cases, the time map manager may need to go back few more entries until the strict sorted order is achieved. FIG. 4 graphically illustrates that in both cases 401 and 406 after the adjustment described above both sequences of tLow timestamps (columns) and tHigh timestamps (columns) become strictly sorted.

For exemplary purposes only, the following table (Table 2) further illustrates timestamp adjustments performed by the time-map manager 112:

TABLE 2

| Received tLow | Received tHigh | Stored tLow | Stored tHigh | Comments |
|---|---|---|---|---|
| 1 | 5 | 1 | 5 | |
| 2 | 7 | 2 | 7 | |
| 4 | 6 | 4 | 7.001 | case 401 |
| 5 | 10 | 5 | 10 | |
| 7 | 11 | 6.997 | 11 | case 406 |
| 8 | 12 | 6.998 | 12 | case 406 |
| 10 | 15 | 6.999 | 15 | case 406 |
| 7 | 16 | 7 | 16 | |
| 12 | 18 | 12 | 18 | |
| −5000 | 19 | 12.01 | 19 | tLow error |

In the table 2, the received tLow and received tHigh columns contain respective tLow and tHigh timestamps associated with data items received by the time-map manager 112, while the stored tLow and stored tHigh columns contain actual timestamp values stored in the time-map table. It is noted that at least some of the values may be adjusted upon insertion by the time-map manager as described above. The comments column in the table 2 indicates a type of the performed timestamp adjustment with respect to insertion scenarios 401 and 406 illustrated in FIG. 4. As noted above, in various embodiments, the time-map manger 112 may stop after making a pre-defined number of backward sorting adjustments for the tLow columns. Table 2 also illustrates that in both cases 401 and 406 after the adjustment described above both sequences of tLow timestamps and tHigh timestamps become strictly sorted.

Figure 5:
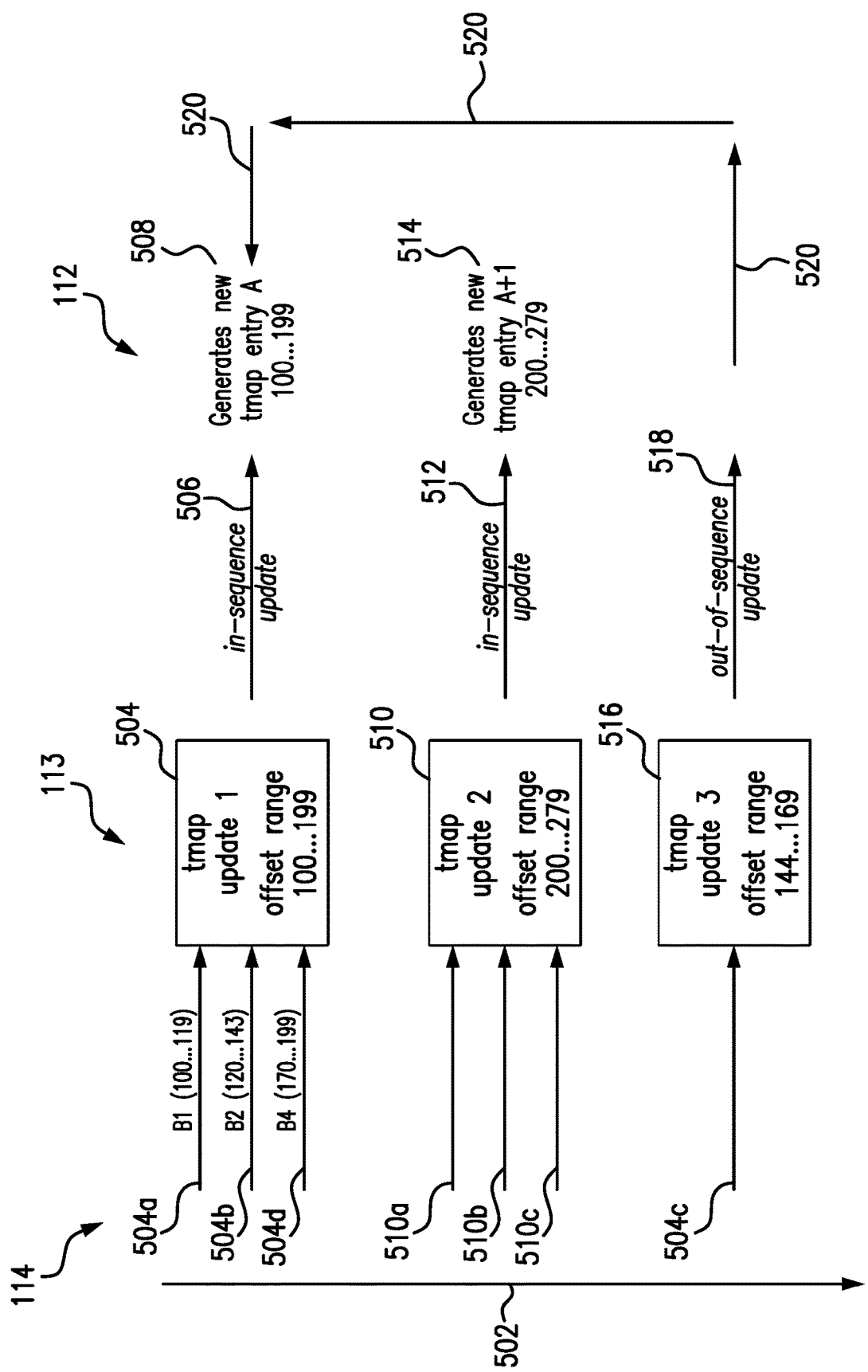
FIG. 5 is a sorting effects diagram of offset information being sorted by the catalog module of FIG. 1, in accordance with an illustrative embodiment of the present invention.

FIG. 5 is a sorting effects diagram of offset information being sorted by the catalog module of FIG. 1, in accordance with an illustrative embodiment of the present invention. As noted above, the Virtual offset range column of the time-map table may require additional sorting if there is some disordering in the updates received from the time-map agent 113. For example, this type of sorting may be required if the offset range included in an update received by the time-map manager 112 from the time-map agent 113 is less than the largest offset already received and stored in the time-map table by the time-map manager 112. In one embodiment, the time-map agent 113 may aggregate multiple buffer write operations, while sending updates to the time-map manager 112. Any out-of-sequence buffer aggregation may cause offset disordering in the updates. If the communication protocol between the time-map agent 113 and the time-map manager 112 substantially guarantees never sending out-of-sequence updates, with respect to virtual offsets, the additional sorting illustrated in FIG. 5 would not be required. For all other embodiments, where updates are potentially delivered to the time-map manager 112 in an out-of-order sequence the technique described below may be used to perform sorting of the virtual offset ranges.

Referring now to FIG. 5, where a vertical axis 502 represents direction of time flow. In this example, the stream writer 114 first sends to the time-map agent 113 contents of buffers B1 504a, B2 504b and B4 504d having offsets 100-119, 120-143 and 170-199, respectively. In response, the time map agent 113 aggregates the contents of the received buffer write operations, generates a first update message 504 associated with the offset range 100-199 and sends the generated in-sequence update message 506 to the time-map manager 112. Once the time-map manager 112 receives the update message 506, it generates a first time map entry 508 also associated with the received offset range 100-199. This sequence of steps is repeated when the stream writer 114 sends to the time-map agent 113 contents of buffers B5-B7 510a-510c having offsets ranging between 200 and 279. Again, in response, the time-map agent 113 generates and sends to the time-map manager 112 a second in-sequence update message 512. Once the second update message 512 is received by the time-map manager 112, a second time map entry 514 associated with the received offset range 200-279 is created.

Next, the stream writer 114 sends delayed content of buffer B3 504c having an offset range 144-169 resulting in out-of-sequence update 518. However, in this case, since the offset range associated with the out-of-sequence update 518 overlaps the offset range associated with the first time map entry 508, the time-map manager 112 does not generate a new time-map entry but rather merges the content (data items) received via the update 518 with the first time-map entry 508 shown by arrows 520. In the process of this merge, the time-map manager 112 may adjust offsets if necessary. It should be noted that if the virtual offset range fills a gap between two consecutive time-map entries, either of the time-map entries can be adjusted by the time-map manager 112. For example, if the first generated time-map entry 508 is associated with the offset range 100-169, the second time-map entry 510 is associated with the offset range 200-279 and the out-of-sequence update 518 is associated with the offset range 170-199, in various embodiments, the time-map manager 112 may merge the delayed data with either the first time-map entry 508 or the second time-map entry 514. After the offset adjustment described above all offsets in the map-table become strictly sorted.

FIG. 6 is a flowchart of operational steps performed for retrieving time-based information performed by the session manager and search engine modules of FIG. 1, in accordance with an illustrative embodiment of the present invention. At 602, the session manager 104 preferably receives one or more data retrieval requests from one or more client applications 102, categorizes them as either data storage or data retrieval requests and passes all received data retrieval requests to the search engine 115. As discussed above, the data stored by the plurality of the data repository units 108 includes a plurality of individual storage blocks, each corresponding to a time range. Data items are stored in a block associated with the time range inclusive of the data item's timestamps. In one embodiment, the data retrieval request includes a certain time criterion (i.e., time range).

At 604, the search engine 115 analyzes and classifies the received data retrieval requests. In one embodiment, the data retrieval requests can be classified with respect to a plurality of ordinal search value types. The search value type can be included as a parameter in the data retrieval requests submitted by client applications 102.

A first exemplary search value type may specify data item's first timestamp (begin-time). This first type of search identifies and returns the entire offset range that is associated with all data items whose first timestamp (tBegin) falls within the time range [qBegin, qEnd] specified in the request, i.e., all data items for which qBegin≤tBegin≤qEnd. In response to receiving the first type of search request, the search engine 115 utilizes the tBeginLow and tBeginHigh columns of the time-map table (see Table 1 above) to perform the search. In particular, the search engine 115 relies on the fact that for each time-map entry in the time-map table all data items associated with a particular virtual offset range have tBegin timestamps that fall within the [tBeginLow, tBeginHigh] time period values associated with that particular offset range in the time-map table.

A second exemplary search value type may specify data item's second timestamp (end-time). This second type of search identifies and returns the entire offset range that is associated with all data items whose second timestamp (tEnd) falls within the time range [qBegin, qEnd] specified in the request, i.e., all data items for which qBegin≤tEnd≤qEnd. In response to receiving the second type of search request, the search engine 115 utilizes the tEndLow and tEndHigh columns of the time-map table to perform the search. In this case, the search engine 115 relies on the fact that for each time-map entry in the time-map table all data items associated with a particular virtual offset range have tEnd timestamps that fall within the [tEndLow, tEndHigh] time period values associated with that particular offset range in the time-map table.

A third exemplary search value type may correspond to stored data item's time interval overlap. This third type of search identifies and returns the entire offset range that is associated with all data items whose time intervals [tBegin, tEnd] overlaps in any way with the time range specified in the request [qBegin, qEnd]. In response to receiving the third type of search request, the search engine 115 utilizes the tBeginLow and tEndHigh columns of the time-map table (see Table 1 above) to perform the search. In this case, the search engine 115 relies on the fact that for each time-map entry in the time-map table all data items associated with a particular virtual offset range have [tBegin, tEnd] time intervals that fall within the [tBeginLow, tEndHigh] time period values associated with that particular offset range in the time-map table. In this case, the search engine 115 retrieves all items for which [tBegin, tEnd] intersects [qBegin, qEnd], i.e., all items for which tEnd≥qBegin and tBegin≤qEnd.

A fourth exemplary search value type may correspond to stored data item's time intervals included within the specified time range. This fourth type of search identifies and returns the entire offset range that is associated with all data items whose time intervals [tBegin, tEnd] contained entirely within the time range specified in the request [qBegin, qEnd]. In response to receiving the third type of search request, the search engine 115 utilizes the tBeginLow and tEndHigh columns of the time-map table (see Table 1 above) to perform the search. In this case, the search engine 115 retrieves all items for which [tBegin, tEnd] is included within [qBegin, qEnd], i.e., all items for which qBegin≤tBegin and tEnd≤qEnd.

At 606, the session manager 104 sends each classified data retrieval request to the search engine 115. According to an embodiment of the present invention, in response to receiving each data retrieval request, the search engine 115 performs a binary search of the time-map table. This type of search necessitates the requirement of strictly sorted order of successful time-map entries. The time map manager 112 achieves the strict sorting order using the techniques described above. Using the binary search, the search engine 115 retrieves time-based information and virtual offset information from the time-map table.

Figure 7:
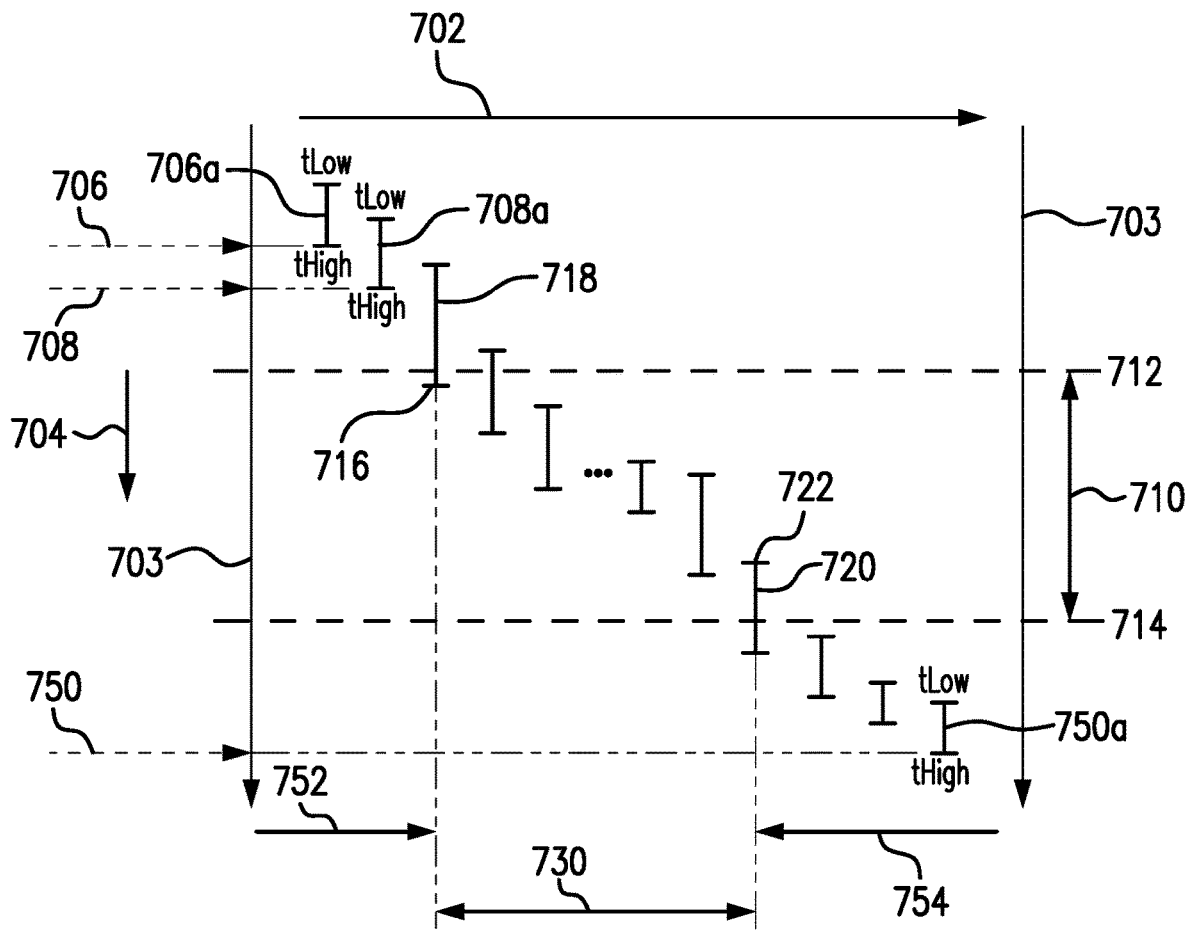
FIG. 7 is a block diagram illustrating how time-based data is retrieved using binary search, in accordance with an illustrative embodiment of the present invention.

FIG. 7 is a block diagram illustrating how time-based data and virtual offset data are retrieved using binary search, in accordance with an illustrative embodiment of the present invention. In FIG. 7, a horizontal axis 702 represents exemplary successive entries stored in the time-map table, while vertical axes 703 represent direction 704 of time flow. The successive entries may be stored in the time-map table by the time-map manager 112 in response to receiving update messages, such as the update message 504 in FIG. 5. For example, a first time-map entry 706a may be created based on the information in a first update message 706, a second time-map entry 708a may be created based on the information in a second update message 708, etc., up to last entry 750a containing time-based information in the last update message 750. Each entry has corresponding tLow and tHigh timestamps associated with it.

FIG. 7 further illustrates a time range 710 specified in the exemplary data-retrieval request. More specifically, the time range 710 includes a range begin time 712 and a range end time 714. In one embodiment, the binary search performed by the search engine 115 consists of two steps. At first step 752, the search engine 115 performs a forward search on all tHigh columns of the time-map table until it finds a first entry having a tHigh timestamp that exceeds (or is equal to) the range begin time 712. This search results in the search engine 115 identifying entry A 718 as the first entry whose tHigh time stamp 716 lies within the time range 710 specified in the data retrieval request. At second step 754, the search engine 115 performs a backward search on all tLow columns of the time-map table until it finds a last entry having a tLow timestamp falling short of (or is equal to) the range end time 714. This second step 754 results in the search engine 115 identifying entry B 720 as the last entry whose tLow time stamp 722 lies within the time range 710 specified in the data retrieval request. It should be noted that in order to improve performance, at least in some embodiments, the search engine 115 may perform steps 752 and 754 substantially simultaneously.

According to an embodiment of the present invention, the two-step binary search performed by the search engine 115 identifies a plurality of time-map entries 730 matching the search criteria (the time range 710). In this embodiment, the search engine 115 returns search results in a form of offset range. A start offset of this range corresponds to the lowest offset associated with the entry A 718 in the time-map table, while an end offset of the search results range corresponds to the highest offset associated with the entry B 720. As illustrated in FIG. 7, since the range begin time 712 and the range end time 714 may fall somewhere between the tLow and tHigh timestamps of some data entries, in one embodiment of the present invention, prior to returning the retrieved offset information the search engine 115 may perform additional check to remove offsets of the data items that do not match the specified search criteria.

Referring back to FIG. 6, the session manager 104 receives virtual offsets matching the specified search criteria from the search engine 115 and sends this information to relevant storage nodes 106. At step 608, one or more storage nodes 106 find specific files within identified DRUs 108, and specific offsets within the identified files where data of a given data stream is stored based on the virtual offset information provided by the search engine 115. Next, the one or more storage nodes 106 perform an access to a particular DRU 108 (e.g. by issuing a corresponding query) in order to read the requested data items. Due to the distributed nature of disclosed storage network 100 architecture, the plurality of data processing functions may be distributed among various storage nodes 106. Advantageously, embodiments of the present invention provide techniques for performing a desired data processing operation in parallel using multiple adaptor components 122a-122n. In other words, the storage nodes 106 may perform multiple collective data processing operations to effect the desired data processing operation.

At 610, once the information relevant to the received requests is provided to the session manager 104, the session manager 104 may reassemble the extracted raw data items satisfying the data retrieval request. However, the aggregation operation is not limited to any specific data item attributes, such as time interval. Upon transmitting aggregated data, the session manager 104 preferably continues to selectively perform steps 602-610 in an iterative manner.

In summary, various embodiments of the present invention describe a novel storage management approach that offers a cost-effective, clustered and highly available network storage solution capable of receiving, processing and storing large amounts of time-based data without adding a significant overhead. Advantageously, the disclosed data management platform employs an elaborate and flexible scheme to retrieve data, which is based primarily on both time-based indices and time ranges that are consistent with the conventional data retrieval procedures and methods defined by a data storage management interface. In another aspect, robustness of data storage system is provided to users through highly flexible catalog software modules that function in an efficient way to maintain consistency between time-based indices (stored in corresponding time-map files) and associated substream data files that is transparent to an application using the disclosed storage network. Various embodiments of the present invention introduce a new approach aimed at customizing substantially all general storage and retrieval functions of the data management platform by providing an ability to search voluminous data through timestamps associated with transactions inside a data stream.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for storing time-based data streams in a high capacity network, the method comprising:

receiving a time-based data storage request from an application, the time-based data storage request is associated with one or more data streams corresponding to one or more catalogs configured to store real time metadata related to timestamp based indexes associated with the corresponding one or more data streams, each of the one or more data streams comprising a plurality of time-ordered data items, each time-ordered data item having a header comprising two or more timestamps, wherein the two or more timestamps represent a time interval associated with the respective time-ordered data items, wherein the timestamps representing a time interval associated with each of the plurality of time-ordered data items comprise a first timestamp, tBegin, indicating data item's begin time and a second timestamp, tEnd, indicating data item's end time wherein the received data storage request further includes dividing each of the one or more data streams associated with the data storage request into a plurality of substreams whereby a time-map agent includes software for defining a virtual address space associated with each substream;

processing the received data storage request to accumulate-data items in a plurality of data files, wherein both time-based information and corresponding virtual offset information are identified and related to the accumulated data items so as to retrieve the time-based information and corresponding offset information by performing a binary search of a data repository which includes retrieving one or more data items from a data file based on the corresponding virtual offset information stored in a catalog having the real time metadata about the corresponding data stream, wherein retrieving the time-based information and the virtual offset information comprises dynamically adjusting granularity of each timestamp based index when memory utilization approaches a physical memory cap;

storing the time-based information and the virtual offset information related to the accumulated data items in a data repository indicated by the catalog having the real time metadata about the corresponding data stream, wherein each entry in the data repository includes time-based information associated with the entry, the time-based information comprising a lowest tBegin timestamp for items associated with the entry, a highest tBegin timestamp for items associated with the entry, a lowest tEnd timestamp for items associated with the entry, and a highest tEnd timestamp for items associated with the entry, wherein the software of the time-map agent generates a unique item identifier (an Enhanced Direct Access Storage Address (EDASA)), which is mapped directly to an item's physical address, wherein the EDASA includes a hierarchy of resource IDs and data items virtual offset information;

determining whether adjustment is necessary for sorting of the stored data in the data repository;

comparing the time-based information related to the accumulated data items with data entries previously stored in the data repository;

determining whether at least one of a) to d):

a) a new entry's highest tBegin timestamp is not strictly greater than a previous entry's highest tBegin timestamp, b) the new entry's lowest tBegin timestamp is not strictly greater than the previous table entry's lowest tBegin entry, c) the new entry's highest tEnd timestamp is not strictly greater than the previous table entry's highest tEnd timestamp, and
d) the new entry's lowest tEnd timestamp is not strictly greater than the previous table entry's lowest tEnd timestamp;

selectively performing the sorting adjustment responsive to the determination, wherein performing the sorting adjustment comprises increasing the new entry's lowest tBegin timestamp to a value greater than the previous table entry's lowest tBegin timestamp but less than the previous table entry's lowest tEnd timestamp; and selectively extending a time range associated with the time-based information based on the determination.

2. The method as recited in claim 1, wherein processing the received data storage request further comprises:
defining virtual address space for each of the plurality of substreams, wherein the virtual address space is associated with the plurality of data files; and
defining a virtual offset for each data item in each of the plurality of substreams, wherein the virtual offset uniquely identifies data items location in the virtual address space.

3. The method as recited in claim 2, wherein defining the virtual offset comprises associating the virtual offset with a name of one of the plurality of data files where the data item is stored and associating the data item with a physical offset, wherein the physical offset uniquely identifies data items location in the data file.

4. The method as recited in claim 2, wherein each entry in the data repository associates a range of timestamps corresponding to a subset of the plurality of data items with a corresponding range of virtual offsets.

5. The method as recited in claim 4, wherein each entry in the data repository includes at least one of the following information: time-based information associated with the entry, virtual offset range information associated with the entry, data file identifier associated with the entry, storage node identifier associated with the entry, data repository unit identifier associated with the entry, statistical information associated with the entry and error handling information associated with the entry.

6. The method as recited in claim 5, wherein determining whether adjustment is necessary for sorting of the stored data in the data depository comprises:
comparing the time-based information related to the accumulated data items with data entries previously stored in the data repository;
determining whether a last timestamp in the time-based information is strictly greater than end time of the corresponding data entry and whether a first timestamp in the time-based information is strictly greater than begin time of the corresponding data entry.

7. The method as recited in claim 1, wherein determining whether adjustment is necessary for sorting of the stored data in the data depository comprises:
comparing the virtual offset information related to the accumulated data items with data entries previously stored in the data repository;
determining whether a range of the virtual offset information related to the accumulated data items is smaller than the largest virtual offset stored in the data repository; and
selectively performing the sorting adjustment responsive to the determination further comprises inserting the virtual offset information between two consecutive entries previously stored in the data repository based on the virtual offset information.

8. The method as recited in claim 7, wherein selectively performing the sorting adjustment responsive to the determination further comprises inserting the virtual offset information between two consecutive entries previously stored in the data repository based on the virtual offset information.

9. The method as recited in claim 1, wherein the EDASA includes at least some of the following information: data item's type and length indicators, stream/substream identifiers associated with the corresponding data item, the identifiers of storage nodes and data repository units associated with the corresponding data item.

* * * * *